United States Patent
Ahmed et al.

(10) Patent No.: US 9,424,025 B2
(45) Date of Patent: *Aug. 23, 2016

(54) VERIFICATION OF BACKWARD COMPATIBILITY OF SOFTWARE COMPONENTS

(71) Applicant: International Business Machines Corporation, Armonk, NY (US)

(72) Inventors: Hatim Ahmed, Cairo (EG); Ali A. S. A. Elgamal, October City (EG); Hisham E. Elshishiny, Cairo (EG); Mahmoud Rashad Ibrahim, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,127

(22) Filed: Jun. 24, 2014

(65) Prior Publication Data
US 2015/0169320 A1  Jun. 18, 2015

Related U.S. Application Data

(63) Continuation of application No. 14/107,394, filed on Dec. 16, 2013.

(51) Int. Cl.
*G06F 9/44*   (2006.01)
*G06F 11/36*  (2006.01)
*G06F 17/22*  (2006.01)

(52) U.S. Cl.
CPC ............. *G06F 8/71* (2013.01); *G06F 11/3604* (2013.01); *G06F 17/2211* (2013.01)

(58) Field of Classification Search
None
See application file for complete search history.

(56) References Cited

U.S. PATENT DOCUMENTS

| | | | |
|---|---|---|---|
| 5,500,881 A * | 3/1996 | Levin | G06F 8/71 717/114 |
| 6,298,353 B1 * | 10/2001 | Apte | |
| 6,415,435 B1 | 7/2002 | McIntyre | |
| 6,651,186 B1 * | 11/2003 | Schwabe | 714/38.14 |
| 6,742,175 B1 * | 5/2004 | Brassard | G06F 8/71 717/107 |
| 6,883,163 B1 * | 4/2005 | Schwabe | 717/126 |
| 6,986,132 B1 * | 1/2006 | Schwabe | 717/168 |
| 7,530,056 B1 * | 5/2009 | Yaari | G06F 11/3604 717/128 |

(Continued)

OTHER PUBLICATIONS

Yannick Welsch et al. "Verifying Backwards Compatibility of Object-Oriented Libraries Using Boogie", ACM, 2006, <https://softech.cs.uni-kl.de/homepage/staff/YannickWelsch/ftfjp.pdf>, pp. 1-7.*

(Continued)

*Primary Examiner* — Thuy Dao
*Assistant Examiner* — Samuel Hayim
(74) *Attorney, Agent, or Firm* — Isaac J. Gooshaw

(57) ABSTRACT

A computer processor determines the backward compatibility of a software component. The processor identifies one or more programming interfaces that are exposed by a first version of a software component. The processor converts the attributes of the exposed programming interfaces into corresponding operations. The processor performs a backward compatibility check by comparing the operations of the first version of the software component to one or more operations of a second version of the software component. The processor determines the backward compatibility of the first version of the software component, based, at least in part, on a result of the backward compatibility check.

10 Claims, 8 Drawing Sheets

(56) References Cited

U.S. PATENT DOCUMENTS

| | | | | |
|---|---|---|---|---|
| 7,788,282 | B2* | 8/2010 | Shekar | 707/796 |
| 7,844,639 | B2* | 11/2010 | Cohen et al. | 707/803 |
| 8,117,293 | B1* | 2/2012 | Anderson | G06F 8/71 709/203 |
| 2003/0172367 | A1* | 9/2003 | Kannenberg | G06F 8/30 717/101 |
| 2004/0111443 | A1 | 6/2004 | Wong et al. | |
| 2004/0139175 | A1 | 7/2004 | Lin | |
| 2005/0132346 | A1* | 6/2005 | Tsantilis | 717/168 |
| 2005/0188356 | A1* | 8/2005 | Lwo | 717/120 |
| 2005/0289264 | A1* | 12/2005 | Illowsky | G06F 1/3203 710/104 |
| 2007/0083874 | A1* | 4/2007 | Vasudevan et al. | 719/328 |
| 2008/0034377 | A1* | 2/2008 | Vo | H04N 9/68 719/320 |
| 2009/0144704 | A1 | 6/2009 | Niggemann et al. | |
| 2009/0249307 | A1* | 10/2009 | Yoshida | G06F 11/3604 717/131 |
| 2011/0078674 | A1* | 3/2011 | Ershov | 717/170 |
| 2013/0085810 | A1 | 4/2013 | Driesen et al. | |
| 2013/0232246 | A1* | 9/2013 | Miller | G06F 9/44505 709/222 |
| 2014/0013205 | A1* | 1/2014 | Mikhaiel et al. | 715/234 |
| 2014/0337823 | A1* | 11/2014 | Sjodin | G06F 8/42 717/144 |

OTHER PUBLICATIONS

Vadym Borovskiy et al., "Ensuring Service Backwards Compatibility with Generic Web Services", IEEE, 2009, <http://ieeexplore.ieee.org/stamp/stamp.jsp?tp=&arnumber=5068827>, pp. 1-4.*

Danny Dig, "Using Refactorings to Automatically Update ComponentBased Applications", ACM 2005, <http://delivery.acm.org/10.1145/1100000/1094948/p228-dig.pdf>, pp. 1-2.*

Borovskiy, et al., "Ensuring Service Backwards Compatibility with Generic Web Services", IEEE Xplore Digital Library, PESOS'09, May 18-19, 2009, Vancouver, Canada, 978-1-4244-3716-0/09 Copyright 2009 IEEE, pp. 95-98, <http://www.ibm.com/developerworks/library/ws-soa-backcomp/>.

Microsoft, et al., "Live Traffic Bifurcation for Backward Compatibility Testing", An IP.com Prior Art Database Technical Disclosure, Original Publication Date: May 30, 2008, IP.com No. IPCOM000171150D, IP.com Electronic Publication: May 30, 2008, Copyright 2008 Microsoft.

Chakrabarti, et al., "Interface Compatibility Checking for Software Modules", ACM Digital Library, CAV '02 Proceedings of the 14th International Conference on Computer Aided Verfication, pp. 428-441, Springer-Verlag London, UK, Copyright 2002, <http://dl.acm.org/citation.cfm?id=734419>.

Endrei, et al., "Moving forward with Web services backward compatibility", May 1, 2006, pp. 1-24, <http://www.ibm.com/developerworks/library/ws-soa-backcomp/>.

Tost, et al., "Building a Service Versioning Gateway with WebSphere ESB and WebSphere Service Registry and Repository V7.5", Redpaper, Copyright IBM Corp. 2011, Redbooks, pp. 1-38.

Kolatzki, et al., "Automated Verification of Functional Interface Compatibility", NTH Computer Science Report 2012/01, May 29, 2012, pp. 1-17, ISBN 978-3-942216-17-3, <http://www.gbv.de/dms/clausthal/H_BIB/lfl/NTH_CompSciRep/2012-01.pdf>.

Mulkers, "Backward compatible Services", Toolbox for IT, Mar. 24, 2006, <http://it.toolbox.com/blogs/composite-apps/backward-compatible-services-8435>.

Ponomarenko, et al., "Backward compatibility of software interfaces: Steps towards automatic verification", ISSN 0361-7688, Programming and Computer Software, 2012, vol. 38, No. 5, pp. 257-267, © Pleiades Publishing, Ltd., 2012, Original Russian Text © A. Ponomarenko, V. Rubanov, 2012, published in Programmirovanie, 2012, vol. 38, No. 5, DOI: 10.1134/S0361768812050052, <http://link.springer.com/article/10.1134%2FS0361768812050052>.

Allamaraju, "Web Services Versioning—Part 1", Dec. 6, 2004, <http://www.subbu.org/blog/2004/12/web-services-versioning-part-1>.

Lausten, "Web services versioning", Feb. 15, 2009, <http://per.lausten.dk/blog/2009/02/web-services-versioning.html>.

U.S. Appl. No. 14/107,394, entitled "Verification of Backward Compatibility of Software Components", filed Dec. 16, 2013.

* cited by examiner

VERIFICATION OF BACKWARD COMPATIBILITY OF SOFTWARE COMPONENTS

BACKGROUND OF THE INVENTION

This disclosure relates generally to the field of software development, and more specifically to verification of backward compatibility of updated software.

Building large complex software products to suit today's needs requires the software developer to heavily re-use existing software libraries or software components that are developed by external parties, such as open source communities or third party vendors.

Since the re-used software libraries or components may be enhanced in newer versions in order to introduce new features or modify the existing ones, software developers may need to upgrade to more recent versions of these software components. This upgrading may require software developers to make changes to their code in order to be able to accommodate the new modifications in the libraries of the new versions.

SUMMARY

Embodiments of the present disclosure provide a method, computer system, and computer program product for determining the backward compatibility of a software component. A processor identifies one or more programming interfaces that are exposed by a first version of a software component. The processor converts the attributes of the exposed programming interfaces into corresponding operations. The processor performs a backward compatibility check by comparing the operations of the first version of the software component to one or more operations of a second version of the software component. The processor determines the backward compatibility of the first version of the software component, based, at least in part, on a result of the backward compatibility check.

DETAILED DESCRIPTION

Figure 1:
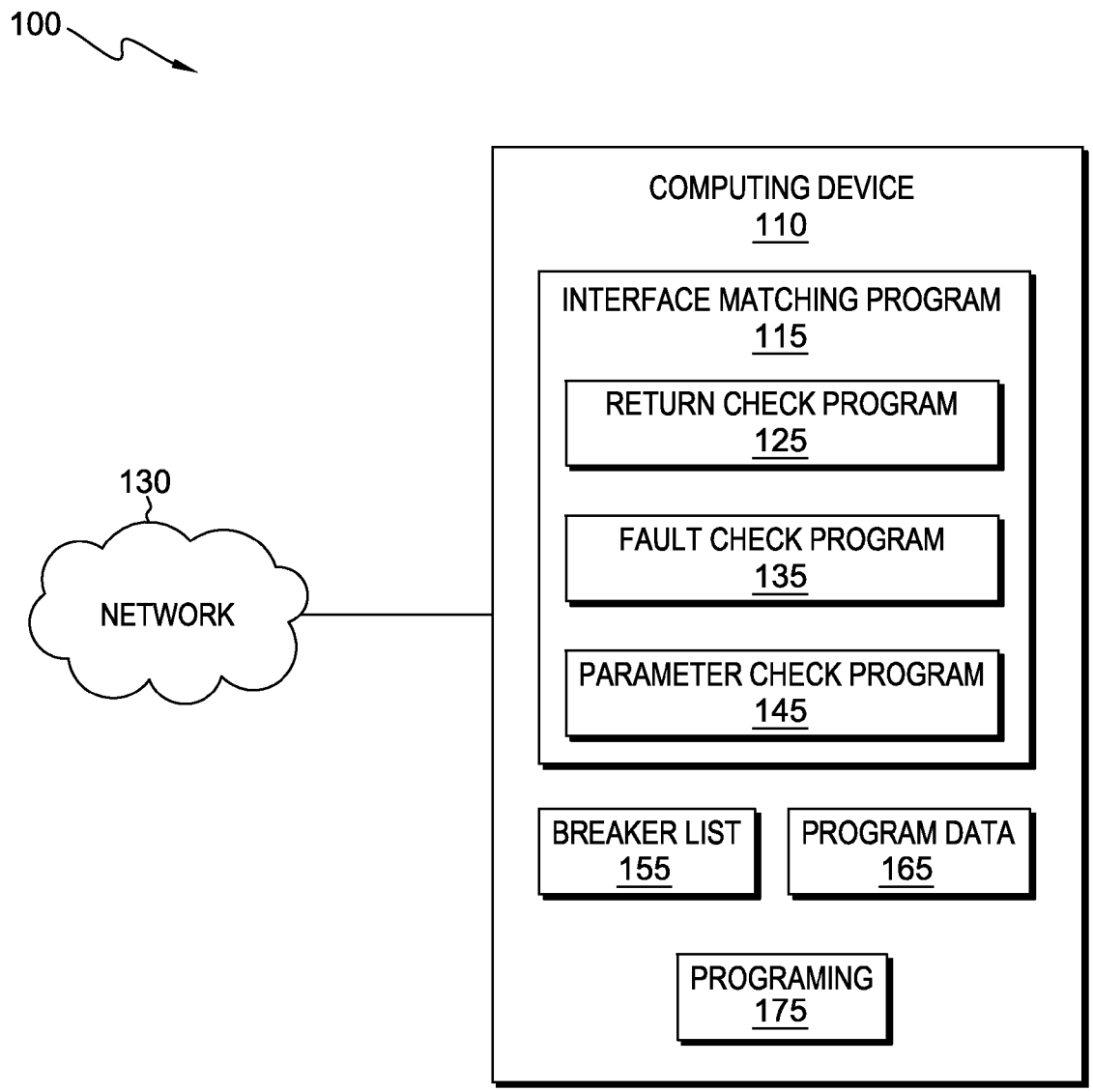
FIG. 1 is a functional block diagram illustrating a software development environment, generally designated 100, in accordance with one embodiment of the present disclosure.

It can be important for a software component user to be able to analyze and identify the changes made to newer versions of a software component, in order to determine the impact of the new software component version on their code. In other words, such an analysis can help inform the user as to whether the newer version of the software component is backward compatible with the older version of the software component. If the software component is not backward compatible with the older version, then such an analysis may indicate what changes are needed in the code of the user in order for their be compatible with the new version of the software component. Such information may be helpful for the user when the user determines whether to upgrade to the new version or continue using the older one.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. It is to be noted that computer-readable storage media herein comprise all computer-readable media, with the sole exception being a transitory, propagating signal.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java", "Smalltalk" and the like may be subject to trademark rights in various jurisdictions throughout the world and are used here only in reference to the products or services properly denominated by the marks to the extent that such trademark rights may exist), Smalltalk®, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Known solutions that address the problem of checking for backward compatibility for software components typically only provide certain guidelines to software component developers regarding how to avoid creating backward compatibility problems when upgrading their software components to newer versions. However, no method in the known art provides a way to detect if a new version of a software component is compatible with user code that reuses a software component of an older version. As such, an object of the present disclosure is to provide a method, system, and software solution to determine whether a new version of a software component is backward compatible with the code of a user of an older version of that software component. A second object of the present disclosure is to provide a comprehensive report that indicates the changes in the new software component version that are not compatible with the user code.

This disclosure provides a novel method to check the backward compatibility of a new version of a software component with a user code that is using an older version of this software component. The method utilizes pruned tree structures for the programmatic interfaces of the two versions of a software component (the new and the older versions), and provides a novel comparison method for the content of the two pruned tree versions, in order to identify and report the existence of backward compatibility breakers. The comparison method described herein allows for the transformation of the nodes of the two trees into other node types in order to complete the backward compatibility check. Advantages of various embodiments of the disclosure may include: (i) a comprehensive report including all the changes in the new version of a software component that are not compatible with the user code that is using an older version of this software component, (ii) implementation by any high-level programming language, and (iii) an assessment of the backward compatibility of any software component programmatic interfaces written regardless of the programmatic language used.

The present disclosure will now be described in detail with reference to the Figures. FIG. 1 is a functional block diagram illustrating a software development environment, generally designated 100, in accordance with one embodiment of the present disclosure. Software development environment 100 includes computing device 110 which is connected to network 130.

In this exemplary embodiment, interface matching program 115, return check program 125, fault check program 135, parameter check program 145, breaker list 155 and program data 165 are stored on computing device 110. However, in other embodiments, interface matching program 115, return check program 125, fault check program 135, parameter check program 145, breaker list 155, program data 165 and programming rules 175 may be stored externally and accessed through a communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110 and interface matching program 115, return check program 125, fault check program 135, parameter check program 145, breaker list 155, program data 165 and programming rules 175 in accordance with a desired embodiment of the present disclosure.

In various embodiments of the present invention, computing device 110 can be a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to interface matching program 115, return check program 125, fault check program 135, parameter check program 145, breaker list 155 and program data 165, and is capable of running interface matching program 115, return check program 125, fault check program 135 and parameter check program 145. Computing device 110 may include internal and external hardware components, as depicted and described in further detail with respect to FIG. 8.

Figure 2:
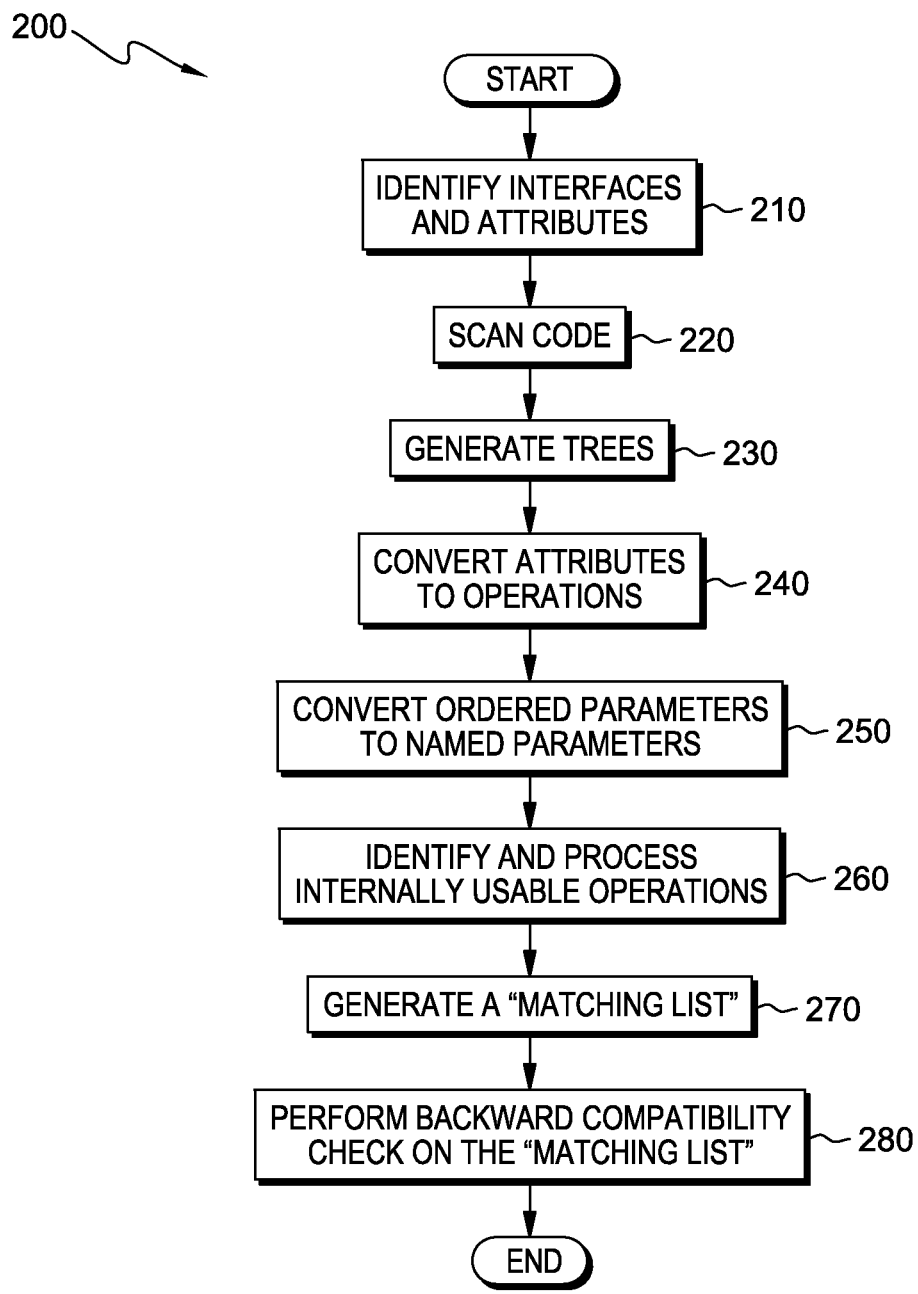
FIG. 2 shows a flowchart depicting a method for generating trees and matching lists for, and determining backward compatibility for, a new version of a software component of a software product, in accordance with an embodiment of the present invention.

In some embodiments, computing device 110 uses the information stored in program data 165 in combination with the method of FIG. 2, interface matching program 115, return check program 125, fault check program 135, and parameter check program 145 to generate "matching lists" and "trees" for multiple versions of a software component, which are stored as part of program data 165, as well as "breaker lists", which are stored as part of breaker list 155. In some embodiments program data 165 already includes the "trees" generated from two versions of the software component. In such a scenario, computing device 110 would utilize interface matching program 115, return check program 125, fault check program 135, parameter check program 145, breaker list 155, program data 165 and programming rules 175 to generate a breaker list based on those trees.

In this first embodiment, program data 165 includes the data, e.g., the code, included in the two versions of the software component. Program data also includes the trees and matching lists that are generated for respective versions of the software component. Breaker list 155 includes lists of backward compatibility issues, herein called breakers, which are related to the software component programming interfaces. Such lists are the result of the backward compatibility analysis described in the discussion of step 280 of FIG. 2, and the respective discussions of processes of interface matching program 115, return check program 125, fault check program 135 and parameter check program 145 (for further details see the discussions of FIGS. 4, 5, 6 and 7).

It is to be noted that herein a "match" indicates that there is an aspect of backward compatibility between the two versions of the software component. For example, "return" matches indicates that there is backward compatibility between a "return" of the older version of the software component and a "return" newer version of the software component. It should be further noted herein that an "un-matched" element indicates an aspect of backward incompatibility between the two versions of the software component. It is to be further noted that the term "software component" is herein defined as a program, which may function as sub-programs of other programs.

A method for generating "trees", "matching lists" and "breaker lists" is described in the discussion of FIG. 2. It is to be noted that in certain embodiments, the various steps and processes described in the respective discussions of FIGS. 2, 4, 5, 6 and 7 can be embodied as purely software, purely hardware, or a combination of both software and hardware. In addition, in various embodiments, the various processes of interface matching program 115, return check program 125, fault check program 135 and parameter check program 145, and the steps of the method described in FIG. 2 can be combined in a variety of ways that are within the scope and spirit of this disclosure.

FIG. 2 shows a flowchart, 200, depicting a method for generating trees and matching lists for, and determining backward compatibility for, a new version of a software component of a software product, in accordance with an embodiment of the present invention. For simplicity, the two versions of the software component that are to be checked for backward compatibility are herein referred to as version 1 (V1 in certain Figures), for the older version of the software component, and version 2 (V2 in certain figures), for the newer version of the software component. The code of the user, i.e., the user code, is a block of code, e.g., a program, which was previously deployed with version 1 of the software component.

In step 210, all programming interfaces are identified, as well as any operations and public attributes that are exposed by version 2 of the software component.

In step 220, the user code that was previously used with version 1 is scanned, using the code of version 1 of the software component. The results of the scan is a list of programming interfaces, operations and public attributes which indicate corresponding programming interfaces of version 2 (identified in step 210) that are consumed by the user code, as well as their respective operations and public attributes.

Figure 3:
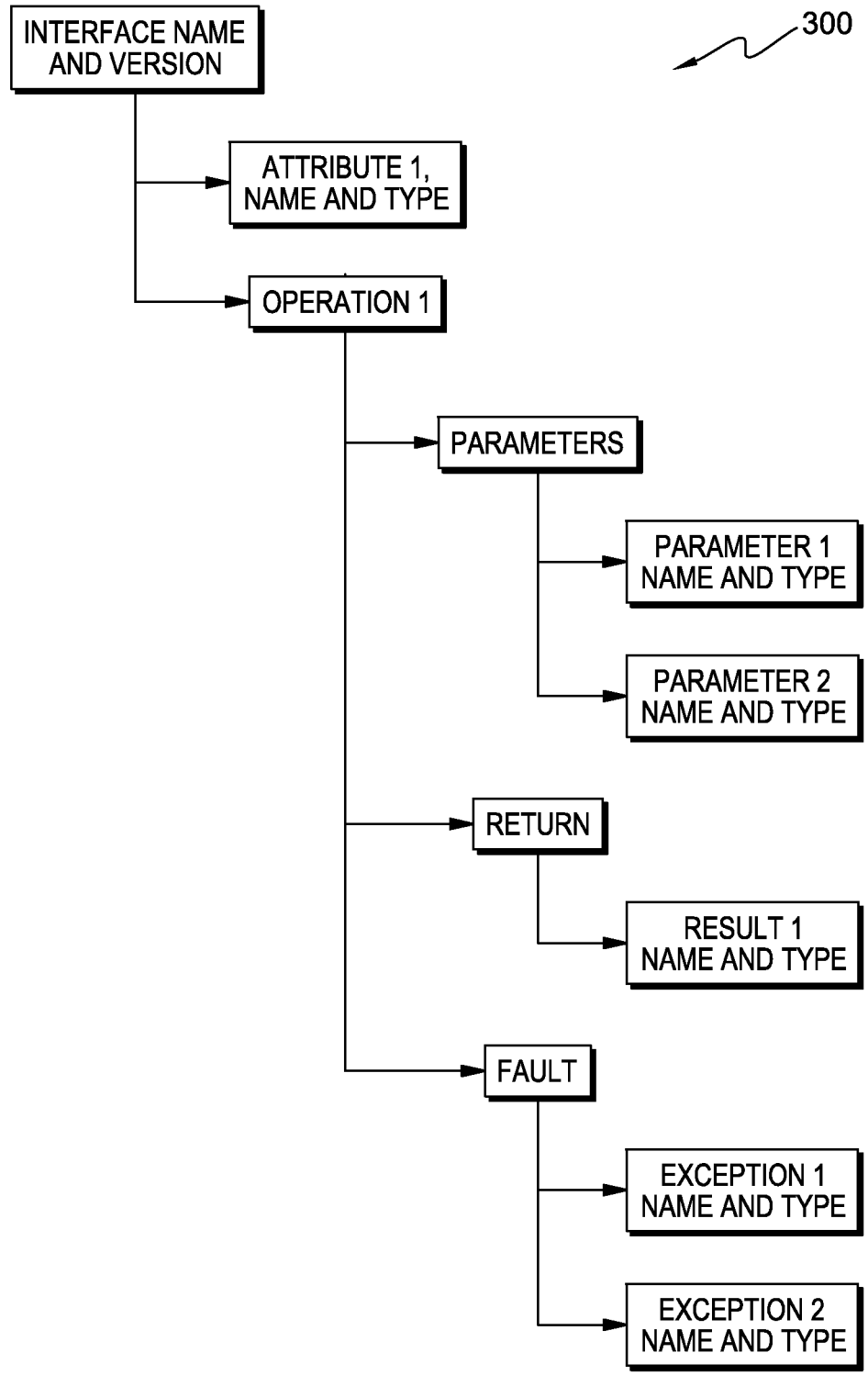
FIG. 3 illustrates a block diagram example of a tree structure that is produced using the method described in FIG. 2, in accordance with an embodiment of the present disclosure.

In step 230, for each programming interface identified in step 220, a tree, e.g., a tree data structure, for each version of the software component is created. In this scenario, a tree for version 1 and version 2 would be created. An example of such a tree structure shown in FIG. 3 as a block diagram, 300. In this embodiment, an attribute or operation that is not utilized by the code of the user (who wishes to use the software component, i.e., needs to know if there is backward compatibility between the two versions of the software component) is not included in the tree structures since there should be no backward compatibility issue for such an attribute or operation. However, in other embodiments, such attributes and operations can be included in such trees.

In step 240, for each tree created in step 230, the attributes are converted such that the following parameters are met:

(a) The generated name of the new operation is unique in the two versions of the same interface.

(b) If the attribute that the operation replaces can be only read by the software component user, then the new operation returns either a result that has the same type as the attribute replaced or does not return anything. For example, Object x is converted to Object getX( ) in the two trees.

(c) If the attribute that the operation replaces can be only written to by the software component user, then the new operation is created such that it has a parameter with the same type as the attribute that was replaced. The name of this parameter must be the same name across the two versions of the same interface. For example, Object x; is converted to setX(Object x) in the two trees.

(d) If the attribute that the operation replaces can be read or written, then two new operations are created while respectively following parameters (b) and (c). For example: Object x; is converted to Object getX( ) and setX(Object x) in the two trees.

(e) A flag is added to the converted attribute indicating whether this attribute is an optional or mandatory attribute.

In step 250, for each tree created in step 230, based on the programming language used; if operation's parameters are defined by Order; i.e., they are "Ordered Parameters", then convert them to "Named Parameters". For example, OperationX(int, float, char) is converted to OpertionX(int param1, float param2, char param3)

In step 260, if any of the parameters of the operation can be internally used by the operation to return an output value (out-direction parameter), then those parameters are added under the "Returns" node as a return of the operation.

In step 270, a "Matching List" is created where each record of the list contains an operation from version 1 and its corresponding operation of version 2 (based on the operation name). The matching list is stored as part of program data 165. If there are multiple operations with the same name (overloading in some programming languages), then create a new record for each one of those respective operations. If an operation exists in version 1 and has no match in version 2, then it is added to the "Breakers List", and not added to the "Matching List", unless it is marked with the optional flag indicator (see step 240 parameter (e)). For example, op1 in version 1 matches op1 in version 2, as such; op1 is added to the "Matching List" as single record. In another example, op2 in version 1 matches op2 and op2' in version 2. As such, op2 is added to the "Matching List" with two different records. In a last example, op3 in version 1 has no match in version 2. As such, op3 is added to the "Breakers List" and is not added to the "Matching List".

In step 280, utilizing the generated "Matching List" of step 270, perform a backward compatibility check between the respective operations of the two generated trees corresponding to version 1 and version 2. If an operation in version 1 has multiple corresponding matching operations in version 2, it cannot be considered backward incompatible, unless all backward compatibility checks fail for all corresponding operations. For further details regarding the processes utilized to perform the backward compatibility check see the respective discussions of FIGS. 4, 5, 6 and 7.

The output of the described method above is a list of backward compatibility issues, or breakers, related to the software component programming interfaces. This list of incompatibilities, i.e., a "Breakers List", may help the software component's user to make an informed decision; and to decide whether to upgrade to the new version or not. The breakers list may also direct users to the changes they are required to make to their code if they decide to upgrade to the newer version of the software component. Each item in the breakers lists; stored as part of breaker list 155, includes a reference to the difference between the two compared versions that would affect the code of the software product.

Turning now to FIGS. 4, 5, 6 and 7; the respective processes of interface matching program 115, return check program 125, fault check program 135 and parameter check program 145 will be discussed. Interface matching program 115, return check program 125, fault check program 135 and parameter check program 145 are utilized by computing device 110 to perform a backward compatibility check and produce a breakers lists, such those stored as part of breakers list 155.

Figure 4:
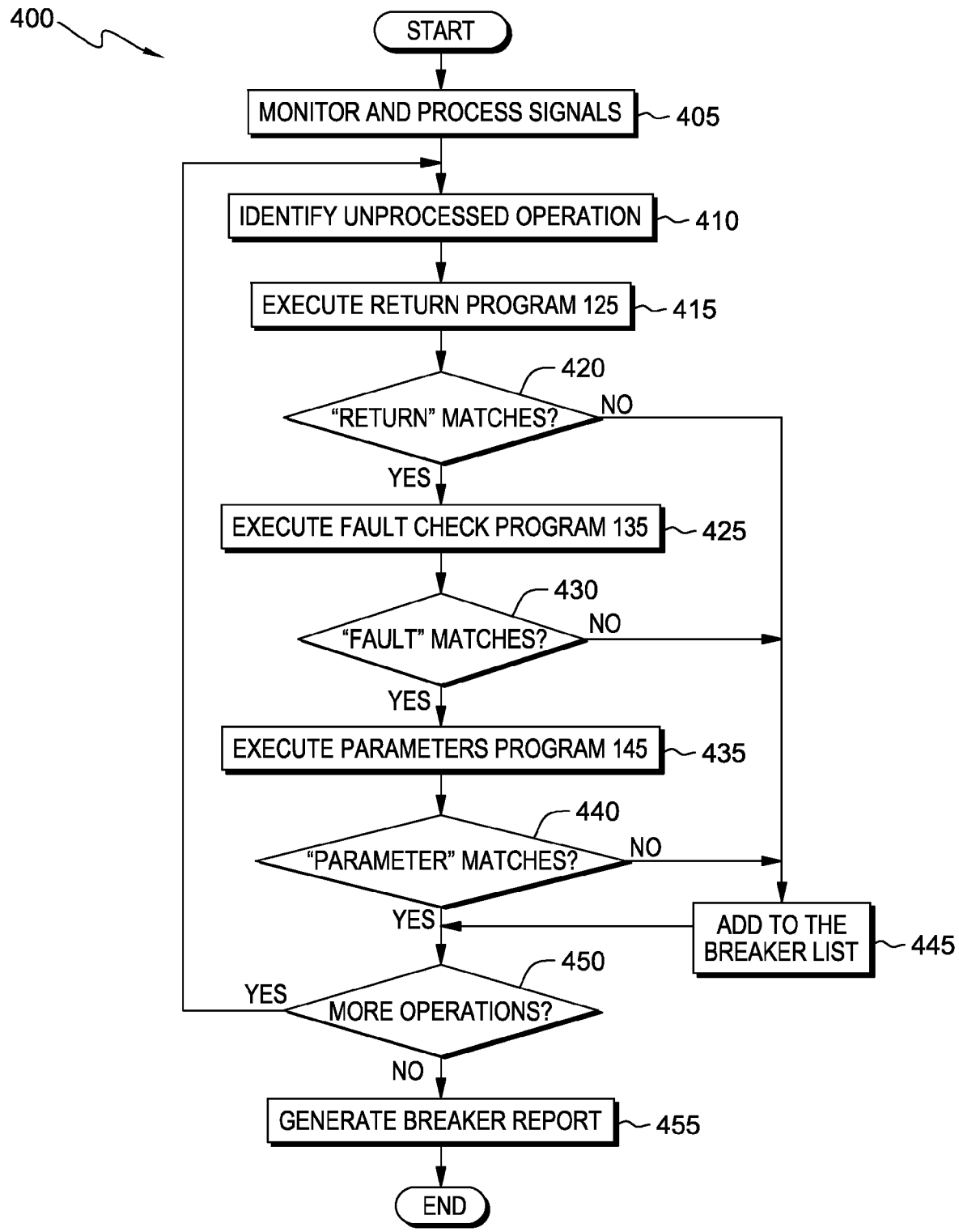
FIG. 4 is a flow diagram depicting the processes of an interface matching program, which performs at least a part of the method steps of FIG. 2, in accordance with an embodiment of the present disclosure.

FIG. 4 is a flow diagram, 400, depicting the processes of interface matching program 115, which performs at least a part of the method steps of FIG. 2, in accordance with an embodiment of the present disclosure.

In process 405, interface matching program 115 monitors and processes the signals from return check program 125, fault check program 135 and parameter check program 145. While this is shown as a single process in the flowchart, it is to be understood that process 405 is continual throughout the execution of interface matching program 115. As signals are received from return check program 125, fault check program 135 and parameter check program 145, interface matching program 115 makes determinations based on the contents of those signals (see the discussions of decision processes 420, 430 and 440 for further details).

In process 410, interface matching program 115 identifies an unprocessed operation, i.e., an operation that has not yet been processed by interface matching program 115, belonging to a tree stored in program data 165. Interface matching program 115 initiates the execution of return check program 125, using the identified unprocessed operation, and receives signals from return check program 125 accordingly, in process 415. In determination process 420, interface matching program 115 determines whether there are "return" matches for the identified operation. Interface matching program 115 determines whether there are "return" matches based on signals from return program 125, which indicate whether or not there is backward compatibility of the "return" elements associated with the identified operation (see the discussion of FIG. 5 for further details regarding the backward compatibility of "return" elements). If there are no "return" matches (determination process 420, no branch), then interface matching program 115 proceeds to process 445. If there are "return" matches (determination process 420, yes branch), then interface matching program 115 proceeds to process 425.

Interface matching program 115 initiates the execution of fault check program 135, using the identified unprocessed operation, and receives signals from fault check program 135 accordingly, in process 425. In determination process 430, interface matching program 115 determines whether there are "fault" matches for the identified operation. Interface matching program 115 determines whether there are "fault" matches based on signals from fault check program 135, which indicate whether or not there is backward compatibility of the "operation fault(s)" associated with the identified operation (see the discussion of FIG. 6 for further details regarding the backward compatibility of "operation fault(s)"). If there are no "fault" matches (determination process 430, no branch), then interface matching program 115 proceeds to process 445. If there are "fault" matches (determination process 430, yes branch), then interface matching program 115 proceeds to process 435.

Interface matching program 115 initiates the execution of parameter check program 145, using the identified unprocessed operation, and receives signals from parameter check program 145 accordingly, in process 435. In determination process 440, interface matching program 115 determines whether there are "parameter" matches for the identified operation. Interface matching program 115 determines whether there are "parameter" matches based on signals from fault check program 135, which indicate whether or not there is backward compatibility of the "operation parameter(s)" associated with the identified operation (see the discussion of FIG. 7 for further details regarding the backward compatibility of "operation parameter(s)"). If there are no "parameter" matches (determination process 440, no branch), then interface matching program 115 proceeds to process 445.

In process 445, interface matching program 115 adds the identified un-matched "return" elements, "operation fault(s)" and "operation parameter(s)" to the list of breakers, which is stored as part of breaker list 155. In other words, "return" elements, "operation fault(s)" and "operation parameter(s)" that are not backward compatible are added to the list of breakers.

If there are "parameter" matches (determination process 440, yes branch), then interface matching program 115 proceeds to decision process 450. In determination process 450, interface matching program 115 determines whether there are more operations that have not been processed. If there are more operations that have not been processed (determination process 450, yes branch), then interface matching program 115 proceeds to process 410 and processes those operations accordingly using processes 410 through 450. If there are no more operations to be processed (determination process 450, no branch), then interface matching program 115 generates a breaker report, in step 455, for that software component and saves it as part of program data 165.

Figure 5:
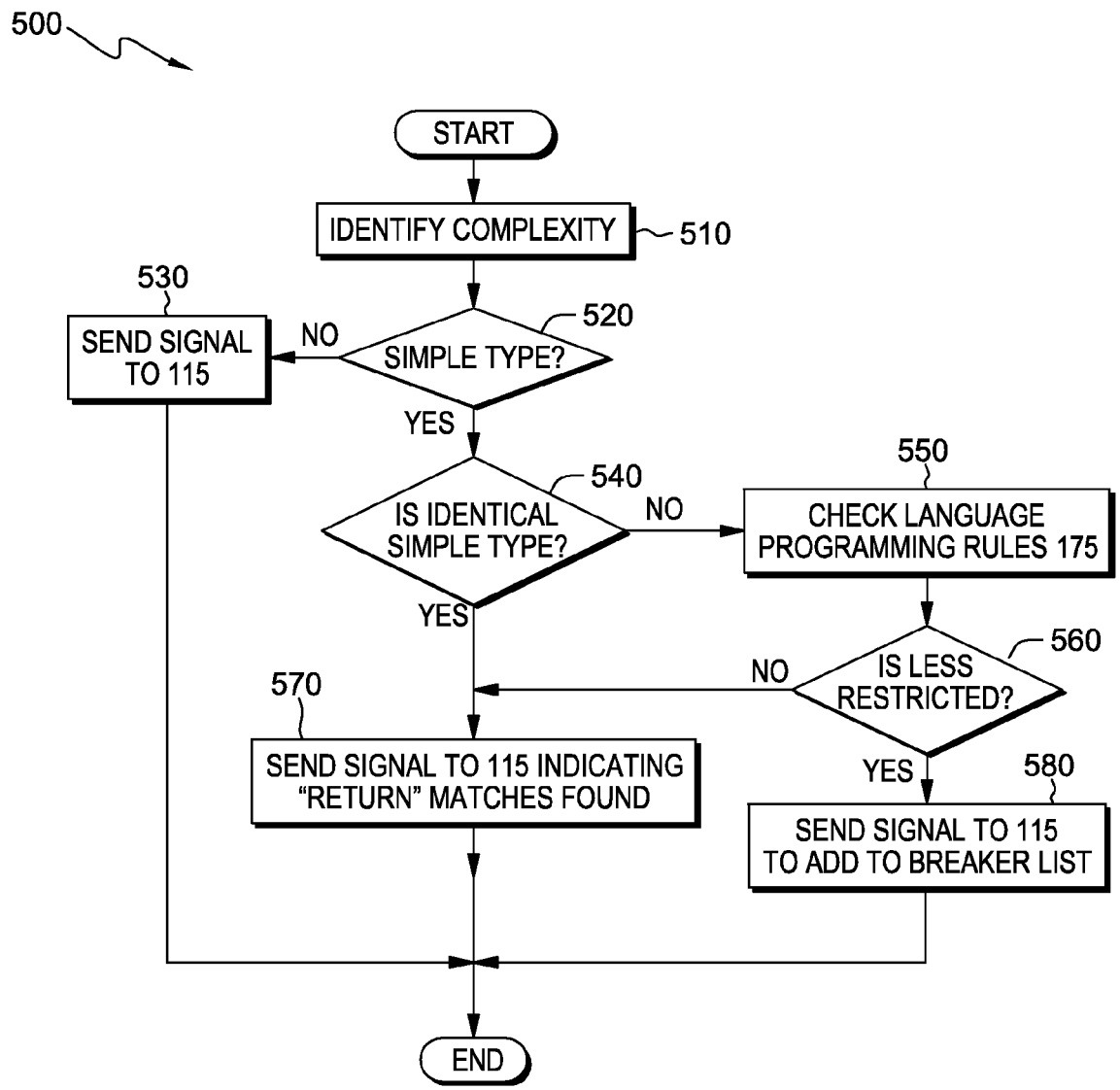
FIG. 5 is a flow diagram depicting the processes of a return check program, which performs at least a part of the method steps of FIG. 2, in accordance with an embodiment of the present disclosure.

FIG. 5 is a flow diagram, 500, depicting the processes of return check program 125, which performs at least a part of the method steps of FIG. 2, in accordance with an embodiment of the present disclosure.

In process 510, return check program 125 identifies the complexity of the return parameter, of the second version, that was identified by interface matching program 115. The return parameter is determined to be either a complex type or a simple type. A simple type of return parameter is a return parameter that is comprised of a primitive data type, such as integers or characters. In contrast, a complex type of return parameter is a composite structure of simple type return parameter, and may include yet other complex type return parameter, e.g., an interface.

In determination process 520, return check program 125 determines whether the return parameter is of a simple type. If the return parameter is not of a simple type (determination process 520, no branch), then return check program 125 proceeds to process 530 and sends a signal to interface matching program 115 indicating that the return parameter is of a complex type. A complex type can not be analyzed as a whole. Therefore, the constituent parts of the complex type must be analyzed individually, i.e., each simple type of the complex type needs to be analyzed for backward compatibility. If a complex type of return parameter is identified, then return check program 125 sends a signal to interface matching program 115 indicating that the each simple type of the complex type needs to be analyzed for backward compatibility. This step is a recursive step that terminates by the eventual identification and analysis of each simple type that is included in a complex type.

For example, if complex type return parameter A includes simple type constituent return parameters B, C and D. Return check program 125 sends a signal to interface matching program 115 indicating that the substituent return parameters of complex type return parameter A need to be analyzed for backward compatibility. In this case, simple type return parameters B, C and D would be passed from interface matching program 115 to return check program 125 individually for processing and analysis.

If the return parameter is of a simple type (determination process 520, yes branch), then return check program 125 proceeds to determination process 540.

In determination process 540, return check program 125 determines whether the return parameter is of an identical simple type as that found in the first version. If the return parameter is of an identical simple type as that found in the first version (determination process 540, yes branch), then, return check program 125 proceeds to process 570. If the operation is not of an identical simple type as that found in the first version (determination process 540, no branch), then, return check program 125 proceeds to process 550.

In process 550, return check program 125 checks the programming language of the return parameter being processed. Then in determination process 560, return check program 125 determines whether the return parameter is less restrictive than the corresponding return parameter of the first version. Return check program 125 makes this determination using programming rules 175. Programming rules 175 is a set of rules that includes rules for conversion of one programming language type into another programming language type. For example, a return parameter of version 1 was of type integer. However, in version 2, the corresponding return parameter became a long value. In this case, the return parameter has been changed from small range (integer) to wider range (long value), thus the return parameter has become less restrictive in version 2.

If return check program 125 determines that the programming language of the return parameter being processed is less restrictive than the return parameter of version 1 (determination process 560, no branch), then return check program 125 proceeds to process 570. In process 570, return check program 125 sends a signal to interface matching program 115 indicating that "return" matches were found, i.e., indicating that the return parameter of version 2 is backward compatible.

If return check program 125 determines that the return parameter is less restrictive than the corresponding return parameter of the first version (determination process 560, yes branch), then return check program 125 proceeds to process 580. In process 580, return check program 125 sends a signal to interface matching program 115 indicating that a breaker is to be added to breaker list 155, thereby indicating that the return parameter of version 2 is not backward compatible.

Figure 6:
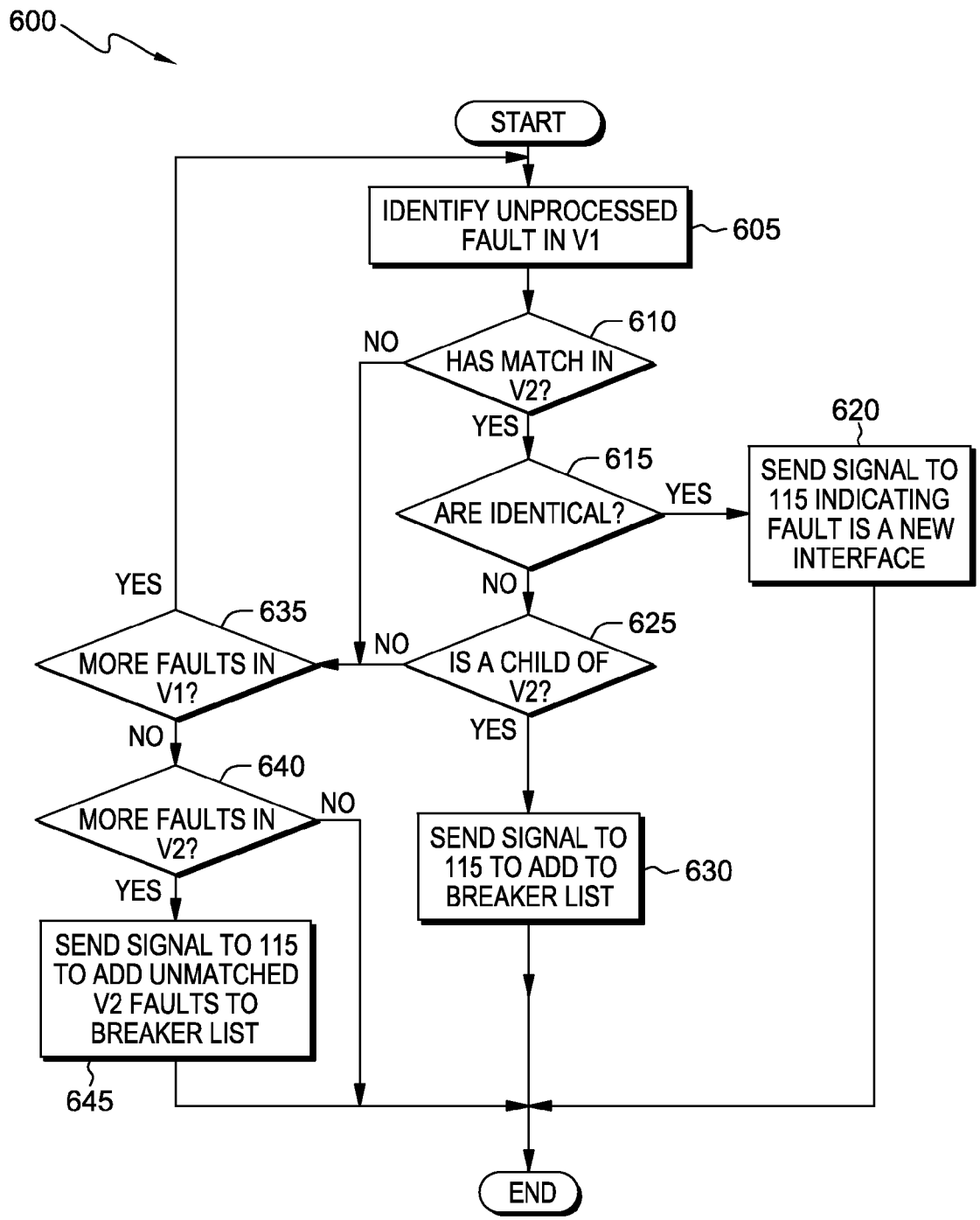
FIG. 6 is a flow diagram depicting the processes of a fault check program, which performs at least a part of the method steps of FIG. 2, in accordance with an embodiment of the present disclosure.

FIG. 6 is a flow diagram, 600, depicting the processes of fault check program 135, which performs at least a part of the method steps of FIG. 2, in accordance with an embodiment of the present disclosure.

In process 605, fault check program 135 identifies an unprocessed fault in version 1. In this embodiment, faults represent types of error messages that a program operation could send in case there was an error during message processing, e.g., an IOException in case of failure to read a file from memory. In determination process 610, fault check program 135 determines whether the unprocessed fault in version 1 has a corresponding fault in version 2. If fault check program 135 determines that the unprocessed fault in version 1 does not have a corresponding fault in version 2 (determination process 610, no branch), then fault check program 135 proceeds to determination process 635. If fault check program 135 determines that the unprocessed fault in version 1 has a corresponding fault in version 2 (determination process 610, yes branch), then fault check program 135 proceeds to determination process 615.

In determination process 615, fault check program 135 determines whether the identified fault in version 1 is identical to the fault of version 2. If the identified fault in version 1 is identical to the fault of version 2, then fault check program 135 proceeds to process 620. In process 620, fault check program 135 sends a signal to interface matching program 115 indicating that the identified fault is a new interface to be processed by interface matching program 115.

If the identified fault in version 1 is not identical to the fault of version 2, then fault check program 135 proceeds to determination process 625. In determination process 625, fault check program 135 determines whether the identified fault in version 1 is a child of the fault of version 2. In this embodiment a parent child relationship of faults refers to a child fault that is of a more specific type of fault that the parent fault. A parent is therefore a general category of faults and the child fault is a subcategory of the parent category. For example, a "runtime" fault includes a wide range of errors that could happen at runtime (i.e., a parent fault), one of these errors is an "out of memory" fault (i.e., a child fault). If the identified fault in version 1 is a child of the fault of version 2 (determination operation 625, yes branch), then fault check program 135 proceeds to process 630. In process 630, fault check program 135 sends a signal to add the identified fault in version 1 to breaker list 155. If the identified fault in version 1 is not a child of the fault of version 2 (determination operation 625, no branch), then fault check program 135 proceeds to determination process 635.

In determination process 635, fault check program 135 determines whether there are more faults in version 1 that have not been processed. If fault check program 135 determines that there are more faults in version 1 that have not been processed (determination process 635, yes branch), then fault check program 135 proceeds to process 605 and identifies the next unprocessed fault in version 1. If fault check program 135 determines that there are more faults in version 1 that have not been processed (determination process 635, no branch), then fault check program 135 proceeds to determination process 640. In determination process 640, fault check program 135 determines whether there are unmatched faults in version 2 that have not yet been identified during the processing of the faults in version 1. If there are unmatched faults in version 2 (determination process 640, yes branch), then fault check program 135 sends a signal to interface matching program 115 to add those unmatched faults to breaker list 155, in process 645. If there are no unmatched faults in version 2 (determination process 640, no branch), then fault check program 135 ends.

Figure 7:
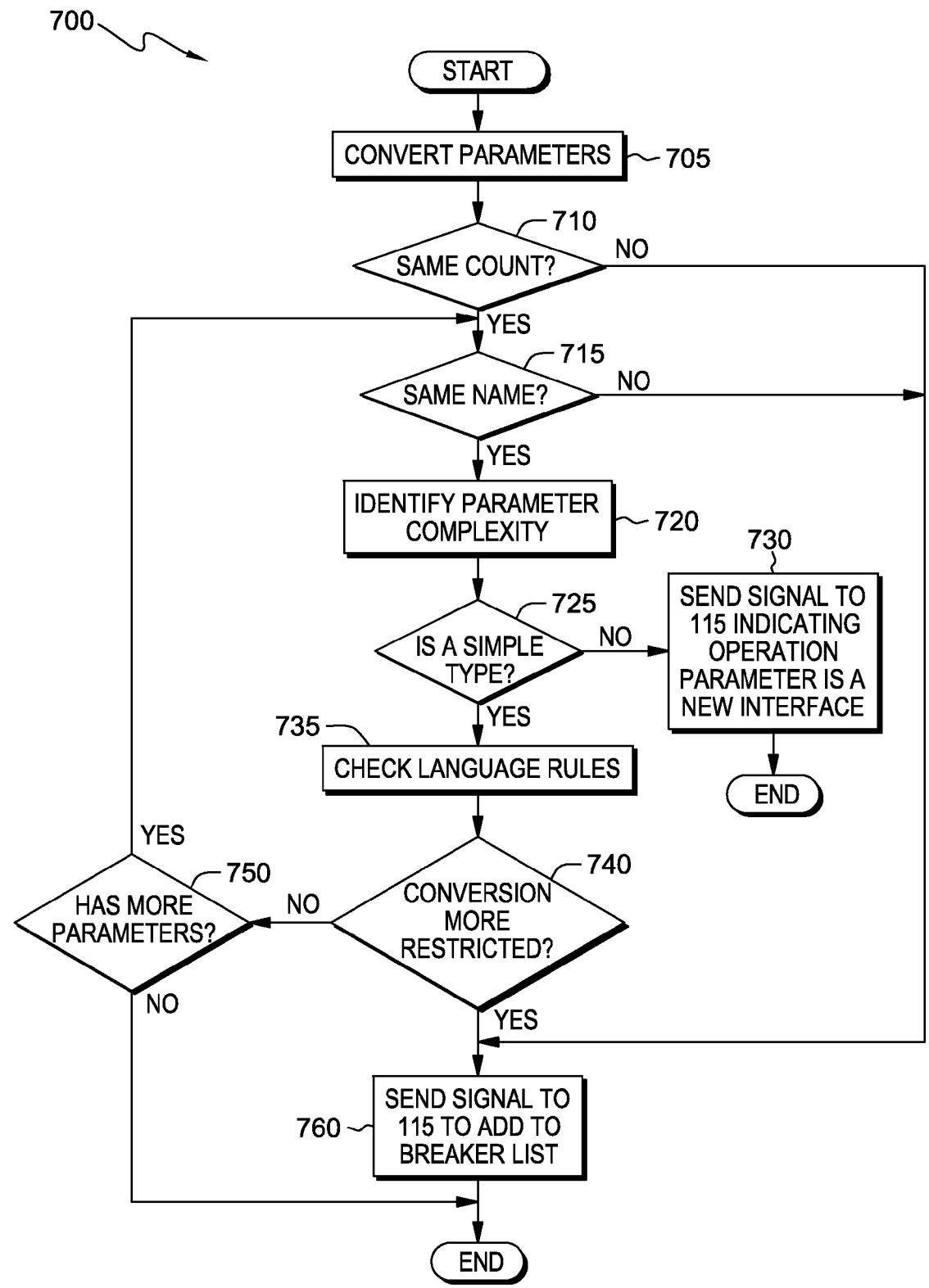
FIG. 7 is a flow diagram depicting the processes of a parameter check program, which performs at least a part of the method steps of FIG. 2, in accordance with an embodiment of the present disclosure.

FIG. 7 is a flow diagram, 700, depicting the processes of parameter check program 145, which performs at least a part of the method steps of FIG. 2, in accordance with an embodiment of the present disclosure.

In process 705, parameter check program 145 converts ordered parameters to named parameters. For example, "OperationX(int, float, char)" is converted to "OpertionX(int param1, float param2, char param3)". In determination process 710, parameter check program 145 determines whether the number of the operation parameters, in version 1 and version 2, is the same. If the number of operation parameters is not the same (determination process 710, no branch), then parameter check program 145 proceeds to process 760. If the number of operation parameters is the same (determination process 710, yes branch), then parameter check program 145 proceeds to determination process 715.

In determination process 715, parameter check program 145 determines whether the names of the operation parameters are the same in version 1 and version 2. If the names of the operation parameters are not the same in version 1 and version 2 (determination process 715, no branch), then parameter check program 145 proceeds to process 760 and sends a signal to interface matching program 115 indicating that the operation parameters without matching names are to be added to the list of breakers, included in breakers list 155. If the names of the operation parameters are the same in version 1 and version 2 (determination process 715, yes branch), then parameter check program 145 proceeds to process 720.

In process 720, parameter check program 145 identifies the complexity of the operation parameters. In this embodiment, a complex type of operation parameter is a structured type of parameter while a simple type of operation parameter is unstructured. In determination process 725, parameter check program 145 determines whether the parameters are of a simple type. If an operation parameter is not of a simple type (determination process 725, no branch), then parameter check program 145 proceeds to process 730 and sends a signal to interface matching program 115 indicating that the operation parameter is of a complex type and that the operation parameter is a new interface to be processed by interface matching program 115. If the operation parameter is of a simple type (determination process 725, yes branch), then parameter check program 145 proceeds to determination process 735. In process 735, parameter check program 145 checks the conversion rules for converting one data type to another data type, which are included in programming rules 175, and determines whether the conversion of the operation parameters from version 1 to version 2 are more restricted. For example, there is an increased degree of restriction when an operation parameter is changed from wider range data type, like long or double data type, to a smaller range data type, like an integer data type. If the conversion is not more restricted (determination process 740, no branch), then parameter check program 145 proceeds to determination process 750. In determination process 750, parameter check program 145 determines whether there are any more operation parameters that have not yet been processed. If there are more operation parameters that have not yet been processed (determination process 750, yes branch), then parameter check program 145 proceeds to process 715. If there are not more operation parameters that have not yet been processed (determination process 750, no branch), then parameter check program 145 ends.

If the conversion of an operation parameter from version 1 to version 2 is more restricted (determination process 740, yes branch), then parameter check program 145 proceeds to process 760. In process 760, parameter check program 145 sends a signal to interface matching program 115 indicating that those operation parameters are to be added to the list of breakers, included in breakers list 155.

Figure 8:
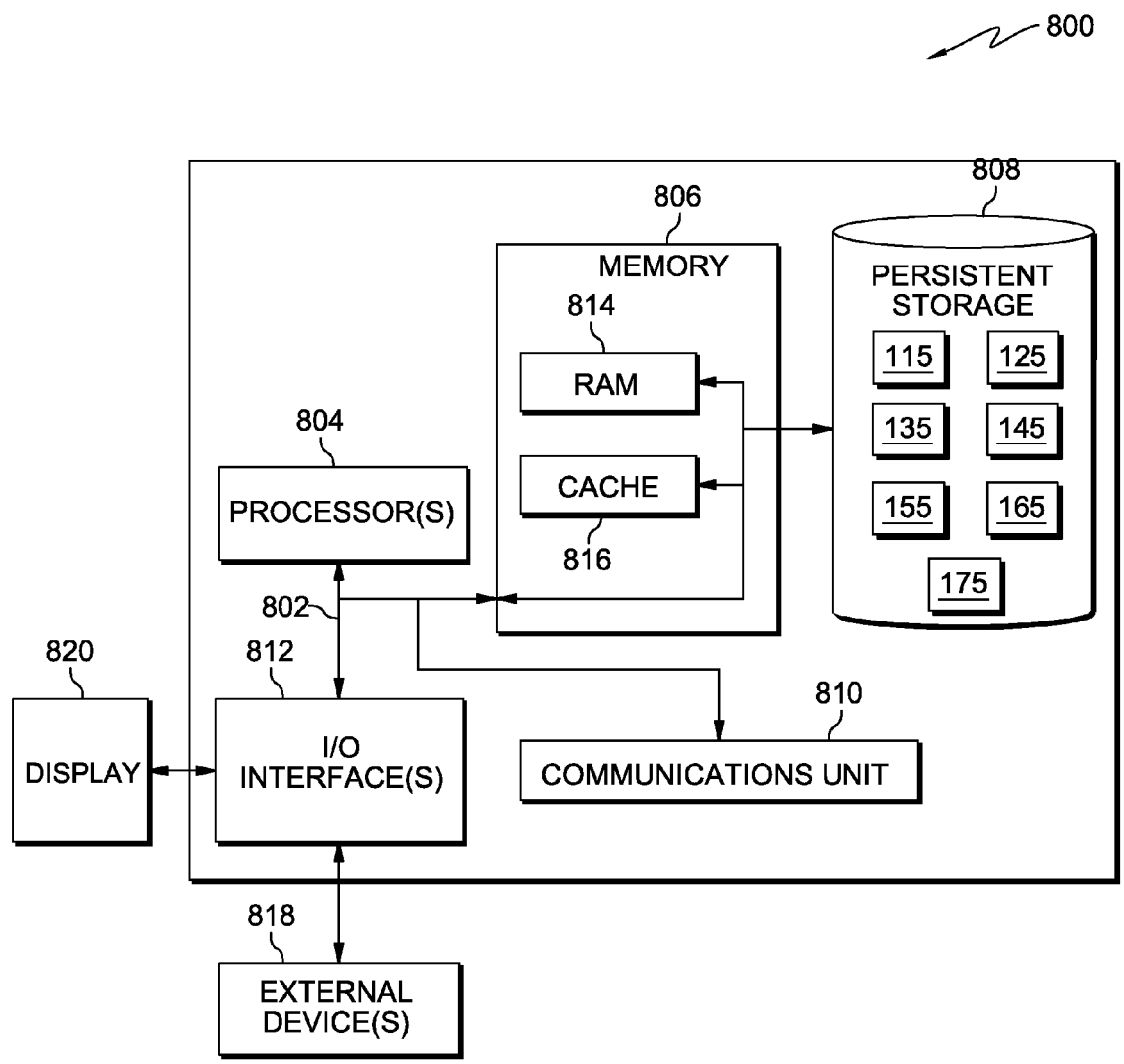
FIG. 8 depicts a block diagram of components of a computing device of FIG. 1, in accordance with an illustrative embodiment of the present invention.

FIG. 8 depicts a block diagram, 800, of components of computing device 110 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 110 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Interface matching program 115, return check program 125, fault check program 135, parameter check program 145, breaker list 155, program data 165 and programming rules 175 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information. Persistent storage 808: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 808.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including the resources of other computing devices that are connected to network 130. In these examples, communications unit 810 includes one or more network interface cards. Communications unit 810 may provide communications through the use of either or both physical and wireless communications links. Interface matching program 115, return check program 125, fault check program 135, parameter check program 145, breaker list 155, program data 165 and programming rules 175 may be downloaded to persistent storage 808 through communications unit 810.

I/O interface(s) 812 allows for input and output of data with other devices that may be connected to computing device 110. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., interface matching program 115, return check program 125, fault check program 135, parameter check program 145, breaker list 155, program data 165 and programming rules 175, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: Any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Programming interfaces: The exposed operations and attributes by the software components that define the interactions among these software components and their users.

Attribute: A key (name)/value pair represents a property exposed by the software component to the outside world.

Operation: A set of grouped actions that the software component can perform and has a name for the user to call or activate.

Operation parameters: The attributes, defined by the operation's interface, that tailor the behavior of this operation to its particular application. These parameters represent a data object(s). According to the programming language, it could be defined as one of the following: (a) Named Parameters: where each parameter is defined by, or associated with, a name. Instead of providing an ordered list of values passed to the operations, it is possible to provide the values in any arbitrary order, since the name attached to each value identifies its purpose. (b) Ordered parameters: In languages without named parameters, the order of parameters is necessarily fixed, since it is the only thing that the language can use to identify which value is intended to be used for which purpose.

Operation Returns: Data values expected to come out as result of a call/activation of this operation.

Operation Faults: The error types that could occur as result of calling/activating this operation. Faults are usually referred to as "exceptions".

"Breakers List": A list (collection) of the findings of the compatibility check between the two software component interface versions. As an example, the deletion of an operation from the old interface version of the software component is considered as compatibility breaker and will be added to this list.

Matching List: A 2-column table were each record of this table represents an operation of the software component interface of the old version of the software component and its corresponding operation(s) in the interface new version of the software component.

What is claimed is:

1. A method of determining backward compatibility of a software component, the method comprising:

identifying, by a processor, one or more programming interfaces that are exposed by a first version of a software component;

converting, by the processor, attributes of exposed programming interfaces into corresponding operations, wherein attributes of the exposed programming interfaces are converted into corresponding operations such that a flag is added to a converted attribute indicating whether the attribute is an optional or a mandatory attribute;

generating, by the processor, respective tree structures for both a first version of a software component and a second version of a software component based, at least in part, on one or both of (i) a programming language of the version of the software component being represented by that tree structure and (ii) a parameter of an operation that can be used internally by that operation to return an output value being included in the tree structure as a return node of that operation;

adding, by the processor, respective identified returns and faults to respective tree structures of the first version of a software component and the second version of the software component;

performing, by the processor, a backward compatibility check by comparing the operations of the first version of the software component to one or more operations of the second version of the software component; and determining, by the processor, a backward compatibility of the first version of the software component, based, at least in part, on a result of the backward compatibility check.

2. The method of claim 1, wherein the step of identifying, by the processor, one or more programming interfaces that are exposed by the first version of the software component further comprises:

scanning, by the processor, code that utilized the second version of the software component; and identifying the programming interfaces that are exposed by the first version of a software component based, at least in part, on a result of the scan.

3. The method of claim 2, wherein the respective tree structures include a name for each respective attribute, a type for each respective attribute, a name for each respective operation, and a type for each respective operation.

4. The method of claim 3, the method further comprising:

identifying, by the processor, at least one of parameters, returns and faults that are associated with each respective operation included in the first version of a software;

identifying, by the processor, at least one of parameters, returns and faults that are associated with each respective operation included in the second version of a software; and adding, by the processor, respective identified parameters, returns, and faults to respective tree structures of the first version of a software component and the second version of the software component.

5. The method of claim 4, wherein each respective tree structure includes a name and a type for each parameter, return and fault.

6. The method of claim 1, wherein attributes of the exposed programming interfaces are converted into corresponding operations such that (i) a generated name of a new operation is unique in two versions of an interface, and (ii) if an attribute that an operation replaces can be only read by a user of the software component, then the new operation that replaces that attribute returns a result that has a same type as the attribute being replaced or that operation does not return anything.

7. The method of claim 1, wherein attributes of the exposed programming interfaces are converted into corresponding operations such that (i) if an attribute that an operation replaces can only be written to by the software component user, then a new operation that replaces that attribute should have one parameter that has a same type as the attribute being replaced, and (ii) if the attribute that the operation replaces can be read or written, then two new operations are created that respectively correspond to the read and write aspects of that operation.

8. The method of claim 3, wherein a given tree structure is generated is based, at least in part, on a conversion of a group of ordered parameters of an operation into named parameters.

9. The method of claim 1, wherein performing the backward compatibility check by comparing the operations of the first version of the software component to one or more operations of a second version of the software component further includes:

generating a matching list wherein each record of the list contains an operation from the first version of the software component and one or more corresponding operation of the second version of the software component.

10. The method of claim 3, wherein performing a backward compatibility check includes comparing the operations of two tree structures using a matching list, and wherein if an operation in the tree structure of first version of the software component has multiple corresponding operations in the tree structure of the second version of the software component, then the operation in the tree structure of first version of the software component is considered backward compatible unless all backward compatibility checks fail for all corresponding operations in the tree structure of the second version of the software component.

* * * * *